US006800357B2

(12) United States Patent
Keberlein

(10) Patent No.: US 6,800,357 B2
(45) Date of Patent: Oct. 5, 2004

(54) MULTILENS STAR BOX AND METHOD FOR MAKING SAME

(75) Inventor: Gerald J. Keberlein, Hortonville, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 10/172,758

(22) Filed: Jun. 14, 2002

(65) Prior Publication Data

US 2003/0232156 A1 Dec. 18, 2003

(51) Int. Cl.[7] ............ B32B 3/00; A47G 35/00

(52) U.S. Cl. ............ 428/172; 428/11; 428/34.1; 428/209; 428/542.2; 428/913.3

(58) Field of Search ............ 428/11, 34.1, 167, 428/172, 187, 209, 542.2, 913.3

(56) References Cited

U.S. PATENT DOCUMENTS 2,486,636 A * 11/1949 Egle ............ 362/31
3,357,772 A 12/1967 Rowland
3,961,575 A 6/1976 Rodabaugh
4,138,517 A * 2/1979 Gardner ............ 428/88
4,159,677 A 7/1979 Smith
4,386,123 A * 5/1983 Coburn, Jr. ............ 428/29
4,427,733 A 1/1984 Pöll et al.
5,156,863 A 10/1992 Pricone et al.
5,856,661 A * 1/1999 Finkelstein et al. ......... 235/487

FOREIGN PATENT DOCUMENTS

DE 1257043 12/1967
EP 0419773 A2 4/1991

* cited by examiner

*Primary Examiner*—Donald J. Loney
(74) *Attorney, Agent, or Firm*—Dority & Manning, P.A.

(57) ABSTRACT

A metallized film exhibiting a star pattern having an illusion of three-dimensions is provided. Methods for making a star-shaped die to manufacture the metallized film and for making a metallized film-covered container and similar products are also provided.

18 Claims, 6 Drawing Sheets

MULTILENS STAR BOX AND METHOD FOR MAKING SAME

BACKGROUND OF THE INVENTION

Prismatic materials that capture and reflect light in different directions are known to convey the appearance of depth or three-dimensions on a flat surface. Such prismatic materials may utilize a Fresnel lens, which is a thin lens having multiple, stepped setbacks that effectively transform the thin lens into multiple lenses with optical properties associated with a much thicker lens.

More specifically, positive focal length Fresnel lenses are almost universally plano-convex originating from a planar side or face and a curved or aspheric side of a conventional lens. To produce the Fresnel lens, the bulk of material between the sides of the conventional lens is reduced by extracting a set of coaxial annular cylinders of material. The contour of the curved surface of the conventional lens is thus approximated by right circular cylindrical portions intersected by conical portions called "grooves." Near the center of the standard circular Fresnel lens, these inclined surfaces or "grooves" are nearly parallel to the plane face; toward the outer edge, the grooves become extremely steep. The grooves thus correspond to a respective portion of the original curved or aspheric surface, which are translated into the piano surface and appear as the familiar "jagged" Fresnel lens.

The Fresnel lens is often viewed in a circular shape, and when backed with a silver-colored material, for example, produces an image of a silver ball appearing to have three-dimensions. Prismatic material of this type is available as a repeating Fresnel pattern film laminate under the trademark Multi-Lens™ by Coburn Corporation, Lakewood, N.J. Heretofore, such film laminates have been limited to simple circular shapes, for example, as a function of circular lathes typically used to produce the Fresnel-type dies used to make the film laminates.

BRIEF SUMMARY OF THE INVENTION

By cutting portions of a circular Fresnel lens into star-shaped components and assembling the components into a star-shaped die, the present invention provides a novel star pattern having an optical illusion of three-dimensional (3-D) stars on a flat surface based on optical light reflection and Fresnel lens light diffraction principles.

A star shape requires substantially straight lines depending from a center of the star shape to obtain the proper light reflection for a 3-D illusion, which is explained in greater detail herein. Nevertheless, the present invention utilizes a lathe that rotates and cuts its products in a circular motion based on a cylindrical lathe diamond turning technique. Of course, other lathes may be used to produce products of the present invention.

By disposing relatively small star-shaped components on an outer edge of the cylindrical lathe's cutting surface, multiple cuts are made on the star-shaped components. Due to the relative size of the star-shaped components, the cuts appear as substantially straight, parallel lines next to each other despite being made by the cylindrical lathe.

When fitted together, the star-shaped components form a star-shaped die, which is used to produce metallized film having 3-D stars or star patterns to cover and finish, for example, a decorative tissue box.

Accordingly, in one aspect of the invention, a method is disclosed for forming a star-shaped die to produce a star-shaped pattern exhibiting a three-dimensional (3-D) illusion. The steps of this method include:

- providing a plurality of metal portions shaped as parts of a star;
- placing the plurality of metal portions on an outer edge of a lathe;
- turning the lathe and the plurality of metal portions to cut a plurality of substantially straight grooves in the plurality of metal portions with a cutter; and
- removing the plurality of metal portions from the lathe and assembling the plurality of metal portions as a star-shaped die configured to form a master shim.

In this method for forming the star-shaped die, holding tools releasably hold the metal portions on the outer edge of the lathe during the cutting step. The grooves are cut in the metal portions by a diamond chip cutter in a circular motion on an arc of an outer edge of the lathe. Alternatively, a lathe can be used that is specifically designed to create straight line grooves.

In some ways similar to the foregoing aspect, the present invention discloses the star-shaped die itself. As suggested by the previous embodiment, the star-shaped die is configured for forming a star pattern to convey an impression of three-dimensions (3-D) on a flat surface.

The present invention provides in a further aspect a metallized rolled web product including an elastomeric base and a metal layer bonded to the elastomeric base. The metal layer and elastomeric base combine to appear as a metallic film exhibiting a plurality of stars, each of the stars having a plurality of grooves, at least one of the plurality of grooves depending substantially straight from a center of each the stars and the plurality of grooves disposed substantially parallel to each other such that a diffractive light illusion of three-dimensions is provided by the metallic film.

To manufacture the metallized rolled web product with stars, any suitable elastomeric base, polymeric substrate, or dielectric material, i.e. electrically insulating material, can be used to receive a metal. For instance, wood, glass, plastic, reaction injection molded urethane, thermoplastic olefins and urethanes, nylon, rubber and polycarbonates can be suitably used. More specifically, plastic pellets, may be extruded as a film and coated with the desired metal such as aluminum, often via vacuum deposition. Also if desired, a polymeric clear coat may be added to the metal layer using conventional techniques, such as casting or doctor-blade applications.

In another aspect of the invention, a method for forming a container with a metallized surface defining a star pattern having an illusion of three-dimensions includes the steps of:

- providing a star-shaped die having a plurality of grooves configured for embossing a "master" or first film;
- forming a debossed surface on the first film by contacting the first film with the star-shaped die, the debossed surface complementing the star pattern of the star-shaped die;
- forming a metallic plate from a metal bath process by depositing the debossed first film in a metal depositing solution, the metallic plate resulting from the metal bath process having an embossed surface imprinted with the star pattern and configured to be operatively disposed on a pattern roll;
- nipping a second film through an embossing nip formed with the metallic plate such that the second film is embossed with the star pattern from the embossed surface;
- metallizing the embossed second film in a metallizing chamber;

adhering the metallized embossed second film to a base material; and forming the carrying material into a container exhibiting a metallized exterior having the illusion of the three-dimensional star pattern.

The container itself is further provided in this invention. The disclosed container has a base layer bonded to a metallized film. Similar to the foregoing embodiment, a plurality of stars are located on the metallized film to exhibit an illusion of three-dimensions (3-D). Each of the stars in this example has five points, each point having a first and a second side depending from a center to a tip of each of the stars. A first plurality of grooves are cut on the first side of a first point and arranged in a direction different from a second plurality of grooves on the second side of the first point. An adjacent plurality of grooves on an adjacent side of an adjacent point are aligned in the direction of the first plurality of grooves. The first plurality of grooves and the adjacent plurality of grooves cooperate to direct ambient light rays relative to the viewer while the second plurality of grooves direct the light rays differently, which contributes to the three-dimensional illusion.

BRIEF DESCRIPTION OF THE DRAWINGS

The above and other aspects of the present invention are apparent from the detailed description below and in combination with the drawings in which.

DETAILED DESCRIPTION OF THE DRAWINGS

Figure 1:
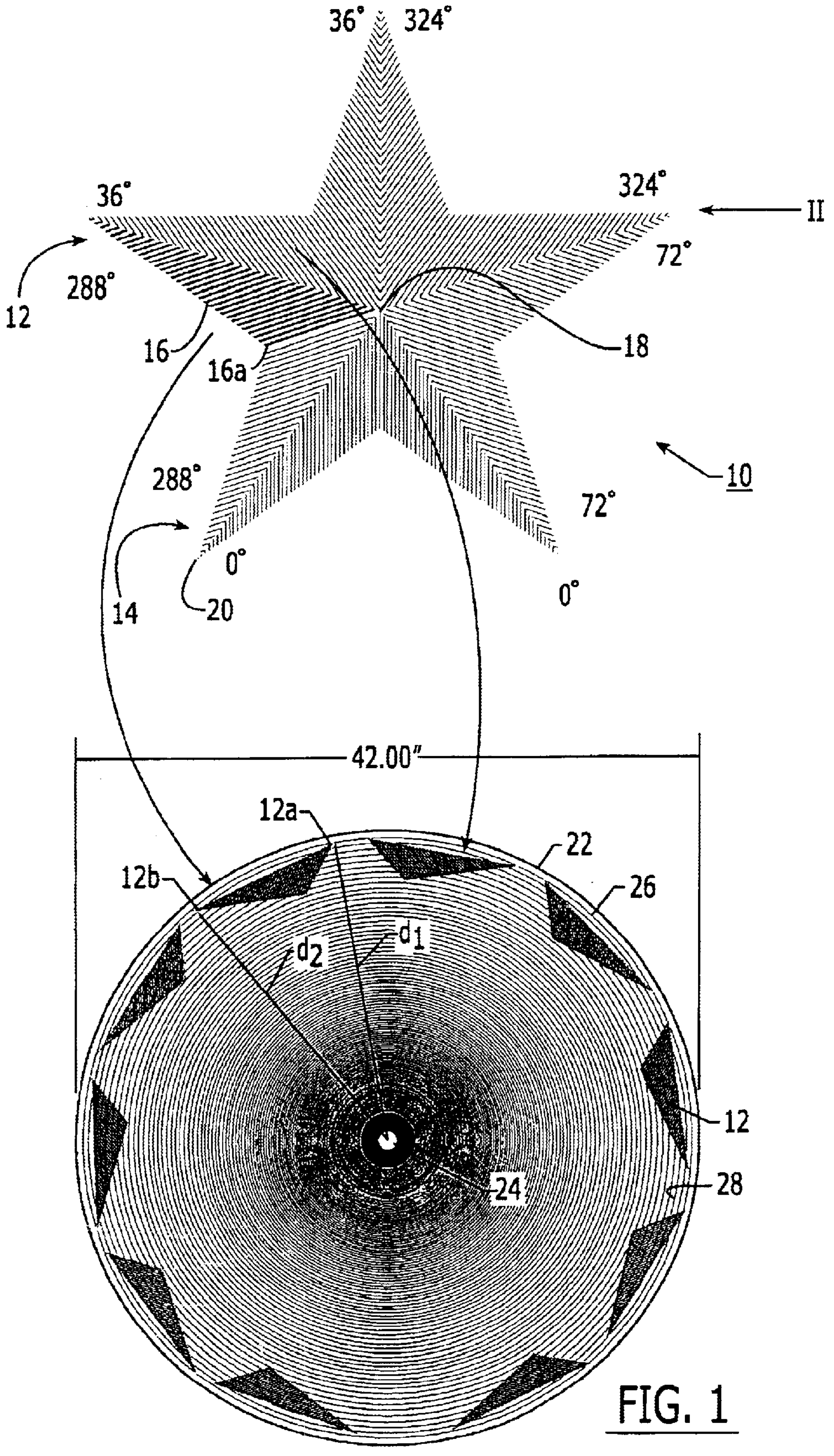
FIG. 1 is a plan view of a circular lathe used to cut apparently straight grooves in star-shaped components that form a star in accordance with an aspect of the invention.

Detailed reference will now be made to the drawings in which examples embodying the present invention are shown. Repeat use of reference characters in the present specification and drawings is intended to represent same or analogous features or elements of the invention.

The drawings and detailed description provide a full and detailed written description of the invention and the manner and process of making and using it, so as to enable one skilled in the pertinent art to make and use it. The drawings and detailed description also provide the best mode of carrying out the invention. However, the examples set forth herein are provided by way of explanation of the invention and are not meant as limitations of the invention. The present invention thus includes modifications and variations of the following examples as come within the scope the appended claims and their equivalents.

In general the present invention is directed to a star-shaped die based on the concept of the plano-convex Fresnel lens. As introduced, the Fresnel lens is usually a single, thin, circular lens having multiple, stepped setbacks that effectively transform the thin lens into multiple lenses having optical properties associated with a much thicker lens.

The present invention "rearranges" the circular Fresnel lens by cutting it into multiple star-shaped portions, which form a multi-lens star-shaped die. The inventive star-shaped die is then used to impart a star or star pattern to a metallized film. The star or star pattern provides an illusion of three-dimensions (3-D). The metallized film can be adhered to a carton, container, dispenser or the like to provide an aesthetic, three-dimensional star pattern.

Figure 2:
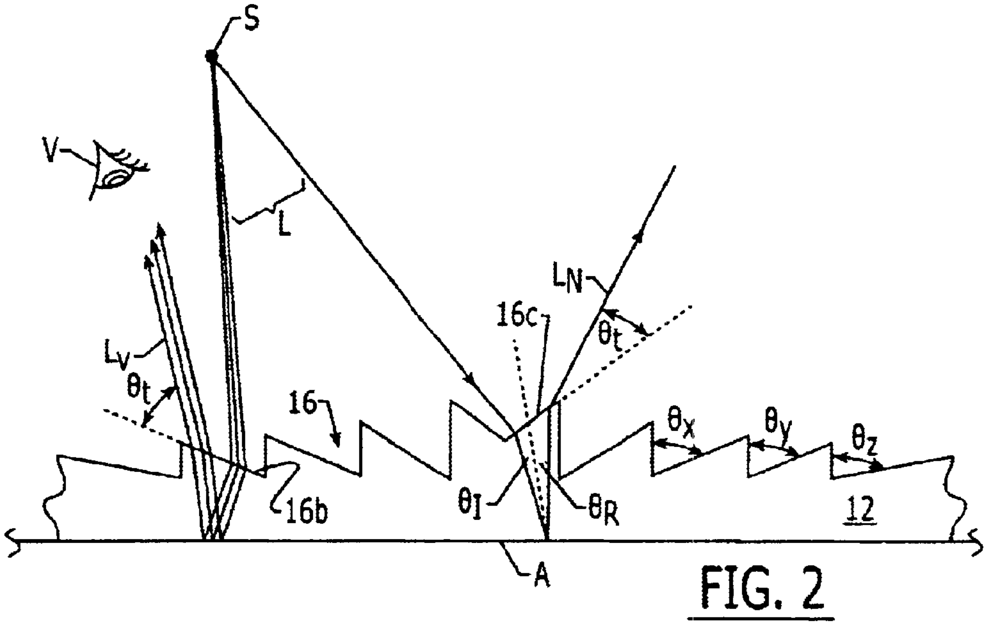
FIG. 2 shows a partial detailed side view taken in a direction of arrow II in FIG. 1 showing selected light rays reacting upon at least two sides of a point of the star.
Figure 3:
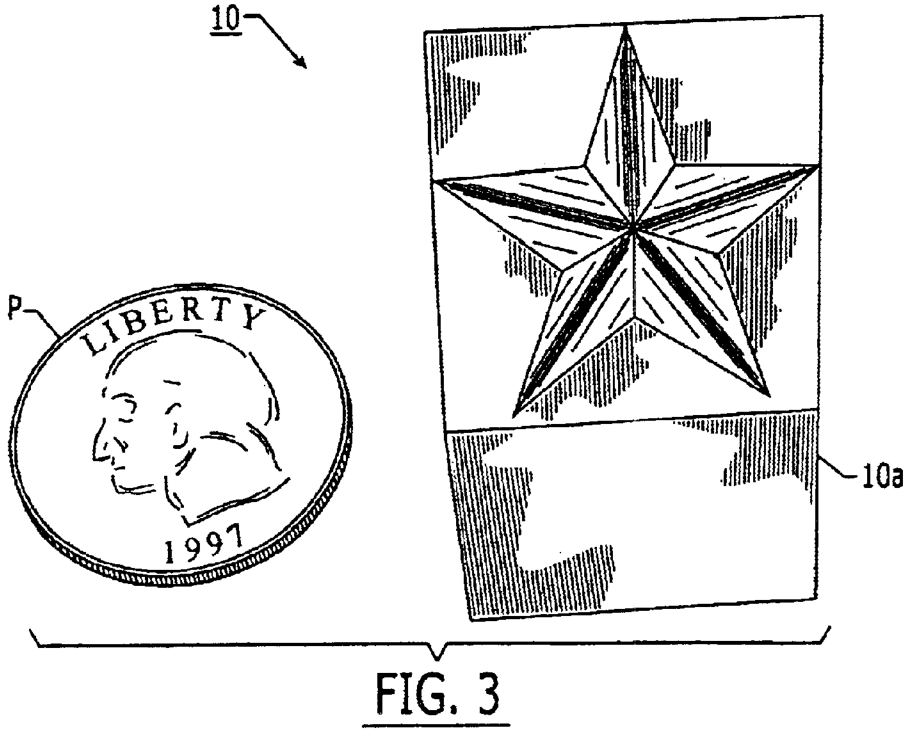
FIG. 3 is a perspective view of a star-shaped die in accordance with an aspect of the invention.

Referring generally to FIGS. 1–3, one embodiment for a star in a star-shaped die is generally indicated by the numeral 10.

It is to be noted that the terms "star", "star-die" and "star-shaped die" are used interchangeably in the following discussion noting that a base 10*a* of the star-shaped die 10 is not shown in FIG. 1 for clarity (see FIG. 3).

In accordance with the present invention, the star-shaped die 10 is made of multiple, triangular-shaped pieces 12, two of which are combined to form a point 14. Each piece 12 has a plurality of grooves 16 inscribed thereon to reflect and/or diffract light as will be discussed in greater detail below.

As seen in FIG. 1, when assembled, the pieces 12 form the die 10 having a midpoint 18 and tips 20 corresponding to respective points 14. In this example, the pieces 12 are brass but can be iron, steel, copper, alloys, or other suitable material.

The star 10 may include ten (10) of the pieces 12 to form a five-pointed star 10 as illustrated in FIG. 1. However, it should be understood that various other star shapes can be made in accordance with the present invention. For instance, by modifying the triangular shape of pieces 12, each point 14 can be accordingly shaped and thus, the star die 10 can assume a different shape; e.g., alternating points 14 might be shorter or longer than neighboring points. Moreover, the number of points 14 of the star 10 can be increased or decreased. Additionally, other geometric shapes other than star shapes are contemplated and are within the scope of the invention. For instance, grooves in accordance with the invention may be cut into rectangular pieces, which may then be used to form crosses, letters, and the like.

With reference to FIG. 1, a circular or cylindrical lathe 22 is shown having a center 24 and an edge 26. In this example, the lathe 22 is approximately 40 to 45 inches in diameter. A series of cutting grooves 28 are spaced on the lathe 22 indicating circular or cylindrical cutting paths made by a diamond chip cutter (not shown). Multiple triangular-shaped pieces 12 are shown placed proximate the edge 26 of lathe 22 in a manner in which a distance from the center 24 to ends 12*a*, 12*b* of the piece 12 is constant. Stated alternatively, a distance $D_1$ from end 12*a* to the center 24 is equal to a distance $D_2$ from end 12*b* to the center 24.

A method for forming the star-shaped die 10 is also illustrated by FIG. 1 in which the lathe 22 is turned or rotated as the diamond cutter cuts the plurality of grooves 16 in the pieces 12. The lathe 22 may utilize holding tools (not shown) to temporarily fix the pieces 12 in position about the edge 26 while cutting the grooves 16. The grooves 16 are cut at varying angles, e.g., $\theta_x$, $\theta_y$, $\theta_z$, from each other each which will each affect light differently as introduced above (see also FIG. 2 and associated discussion below). The grooves 16 are cut to a depth of between 0.001 mils (0.000001 inches) to about 0.5 mils (0.0005 inches), and more specifically, to a depth of about 0.005 mils (0.000005 inches). Once the grooves 16 have been cut to the desired depth, spacing, and angles described above, the pieces 12 are removed from the lathe 22 and formed into the star-shaped die 10, including the base **10*a* as shown in FIG. 3**.

FIG. 2 shows an enlarged view of the grooves 16 from a portion of star 10. In this example, light rays L are illustrated emanating from a light source S indicated by ray traces $L_v$, $L_n$. For discussion purposes and clarity, only a selected, limited number of light rays L are shown. Additionally for the following discussion, the pieces 12 in FIG. 2 are assumed to be a transparent media since the star 10 may be used in a process described herein to ultimately emboss a product such as plastic film with a star shape that complements the star 10; i.e. a "mirror-image" substrate star is made by the brass star 10. Thus, the plastic film star shape would react to light according to the following description.

In accordance with the laws of geometrical optics, the law of reflection teaches that an angle of incidence $\theta_I$ of light is equal to an angle of reflection $\theta_r$, expressed as $\theta_I=\theta_r$. The law of refraction (also known as Snell's law) states that the sine of the angle of refraction is directly proportional to the sine of the angle of incidence expressed by the equation:

$$\frac{\sin\theta_I}{\sin\theta_t}$$

In view of these optics laws and as seen in FIG. 2, some of the light rays $L_v$ encounter a surface **16*b* of groove 16. The rays $L_v$ are reflected and refracted to be seen by a viewer V instead of being focused on an opposite side of the star 10 from the viewer V. This reflection is due to a reflecting surface A such as aluminum, which is attached to the pieces 12** as will be further described below.

Another light ray $L_n$ encounters a surface **16*c* in FIG. 2 but is not seen by the viewer V since light ray $L_n$ refracts away from viewer V. Stated another way, in this example the viewer V sees light rays $L_v$ refracting via surface 16*b* since the viewer V is disposed at a viewing angle equal to the angle of refraction $\theta_t$ of light rays $L_v$. Conversely, the viewer V does not see the light ray $L_n$ refracting via surface 16*c*** since the viewer V is not disposed on a viewing angle equal to the angle of refraction $\theta_t$ of light ray $L_n$.

As introduced above, the plurality of varying angles $\theta_x$, $\theta_y$, and $\theta_z$ are configured to each reflect and refract light differently. It can be imagined, therefore, that the viewer V viewing star 10 as a whole will fully see some light rays L, not see other light rays L, and partially see yet others of the light rays L depending on the viewer's position relative to the plurality of angles $\theta_x$, $\theta_y$, $\theta_z$. More specifically, at different viewing positions, the viewer V will have different focal points (not shown) which focus different aspects of the star shape. Thus, the arrangement of grooves 16 seen in FIG. 2 by example ensures that the viewer V is impressed with an illusion of a three-dimensional star on the flat surface A. It is to be noted that the elements and objects of FIG. 2 are not drawn to scale and are merely intended for illustration purposes. For instance, angles $\theta_x$ and $\theta_y$ have different inclinations but such detail is not depicted in FIG. 2.

As shown in FIG. 3, the star die 10 is shown relative to a perspective piece P. In this example, the entire die 10 is shown with the base **10*a*, briefly introduced above. Evident from this perspective, the star die 10 is relatively delicate and small. Usually constructed of brass, the star 10 is refined to a mirror-like finish such as approximately 1/1,000,000 of an inch (0.000001 mils) and should be handled with gloves to avoid contamination such as by acid on hands. Despite its relative delicacy, the star die 10 can be used to emboss and create multiple master shims, discussed in detail below. Although the star die 10 is made of brass in this example, the pieces 12, which make up the star 10**, may be selected from a material such as iron, steel, copper or other alloys as required.

Figure 4:
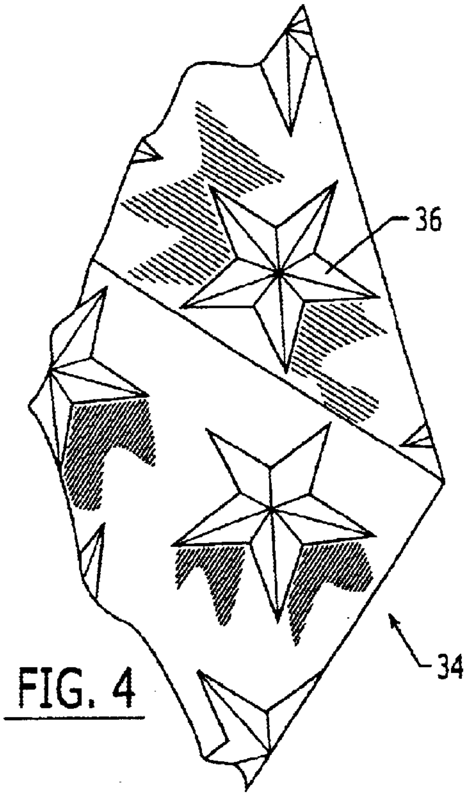
FIG. 4 shows a piece of a metallic plate exhibiting the star-shape of the die of FIG. 3.

A portion of a nickel plate 34 is seen in FIG. 4. The nickel plate 34 is formed, for instance, by first debossing a substrate or first film 32 by the star 10, and then immersing the first film 32 in a nickel bath (see FIG. 8). As known in the art, the debossed first film 32 is known as a "master shim." Because it has been debossed, i.e., the star 10 has been used to impress its shape into the film 32, the master shim is known in the industry as an "innie". In turn, the film 32 or master shim is used to form multiple plates 34, which exhibit, in this example, an embossed star shape 36. The embossed star shape 36 "stands up" on the nickel plate 34 and is therefore known as an "outie." This process is described in greater detail with respect to FIG. 8 below.

Figure 5:
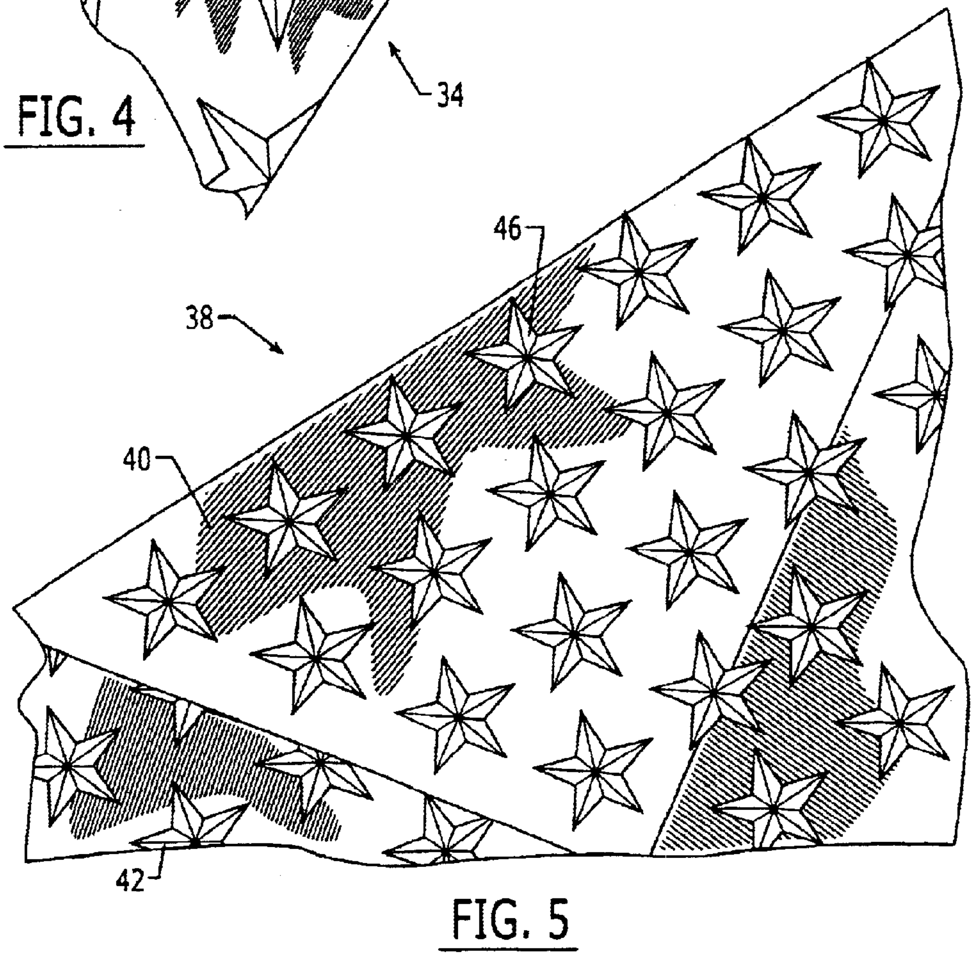
FIG. 5 shows a portion of metallized film in accordance with an aspect of the invention.

As seen in FIG. 5, once the nickel plate 34 is formed, it can be rollably attached, for instance, to a pattern roll 50 (see FIG. 8) to make a metallized film 38. The metallized film 38 defines a metallized side 40 and a side 42, usually colored and having a plurality of decorative stars 46 disposed thereon. The process for debossing a second film 62 with the nickel plate 34 to make the metallized film 38 will be described in greater detail below. Also described in greater detail herein, the metallized film 38 may be rolled into a metallized plastic film roll **38*a*** and shipped to remote sites or placed in storage for future use to be adhered to various products.

Figure 6:
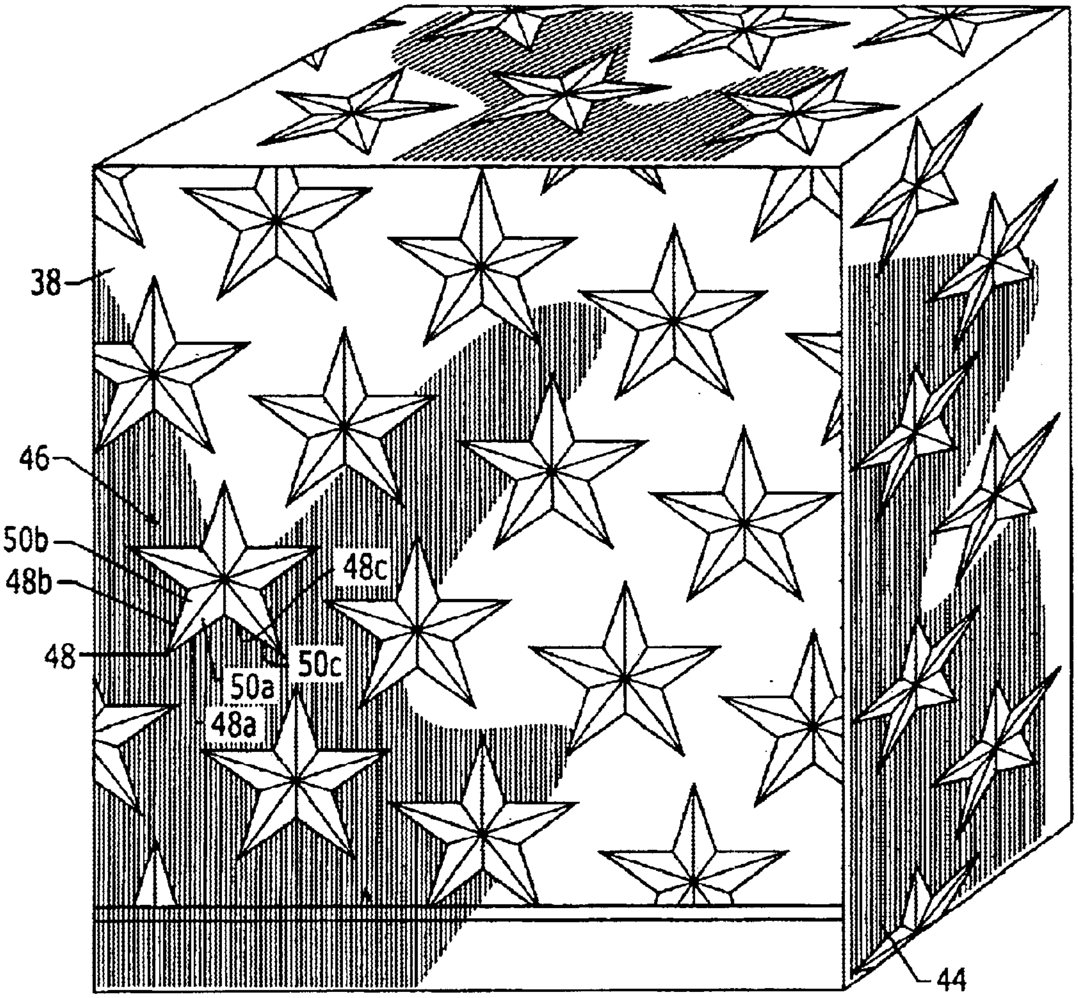
FIG. 6 is an embodiment of a carton having the metallized film.

Seen by way of example in FIG. 6, a tissue box 44 is shown covered with the metallized film 38. The metallized film 38 is bonded to a base layer (not shown) such as a cartonboard, plastic, polymer, wood, metal, cloth, ceramic, or the like. The plurality of decorative stars 46 disposed on the box 44 exhibit the illusion of three-dimensions as previously described.

Also seen in FIG. 6, each of the stars 46 has five points 48 which are bifurcated into a first and a second side **48*a*, 48*b*, respectively. Side 48*a* has a first plurality of grooves 50*a* disposed in a direction different from a second plurality of grooves 50*b* on the second side 48*b*. However, side 48*a* with grooves 50*a* are aligned in the same direction as another side 48*c* with an adjacent plurality of grooves 50*c* to direct ambient light rays relative to the viewer V. As FIG. 6 shows and as previously described, this arrangement lends itself to an illusion of three-dimensional stars 46. It should be noted that although a tissue box 44 is shown in FIG. 6, the metallized film 38 can be used to cover any number of products 56 such as shipping packages, beverage containers, picture frames, walls, books or other items on which a bondable cover such as metallized plastic film 38** can be adhered.

Figure 7:
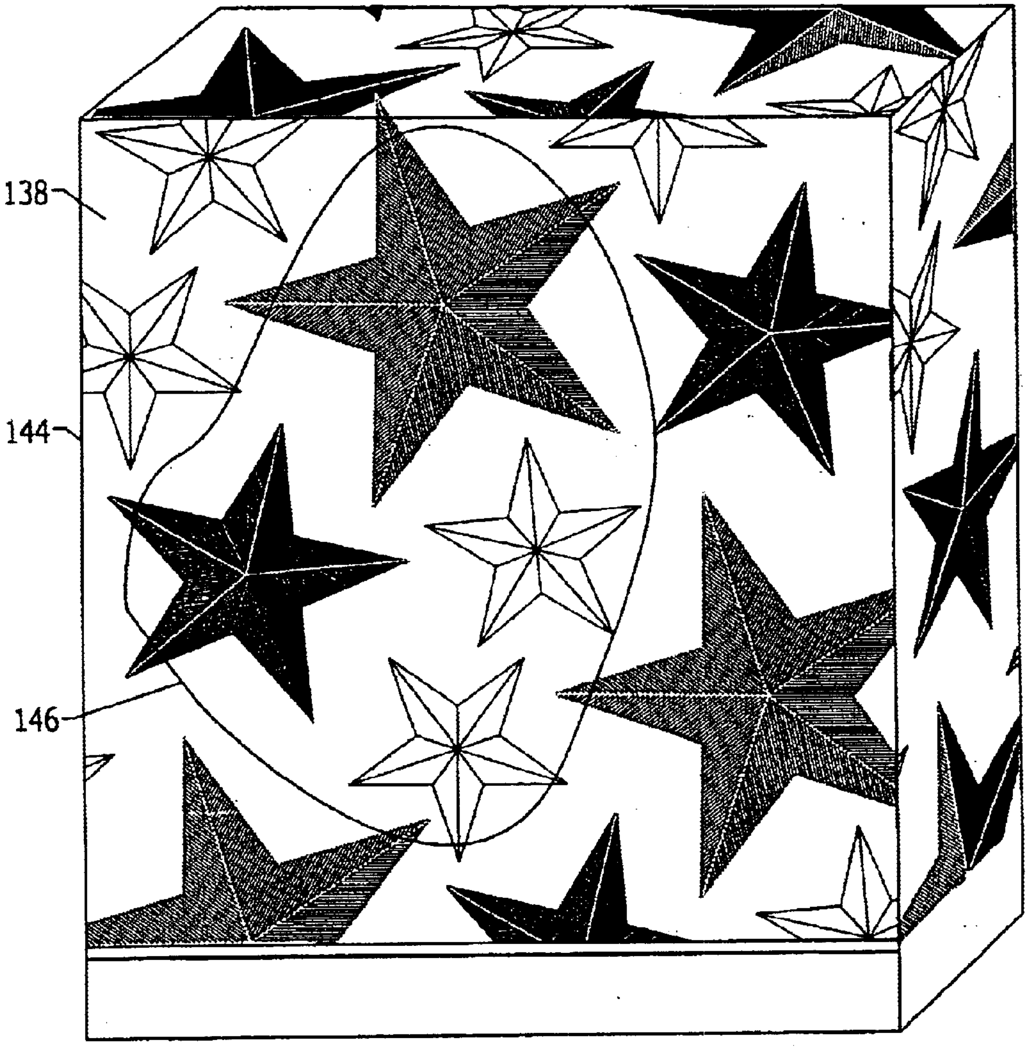
FIG. 7 is a presentation analogous to FIG. 6 of another embodiment of the carton with metallized film.

FIG. 7 shows an alternative embodiment similar to FIG. 6 in which a pattern of stars 146 is disposed on a metallized film 138 and repeated about a box 144. In this example, the pattern 146 has a number of stars which are sized relatively different from one another. The pattern 146 is repeated about the box 144 in a manner similar to the star 46 in FIG. 6. Once again, it is contemplated that box 144 be any number of products capable of covering with the metallized film 138. Therefore, film 138 should not be construed as being limited only to use on a box shape as shown.

Figure 8:
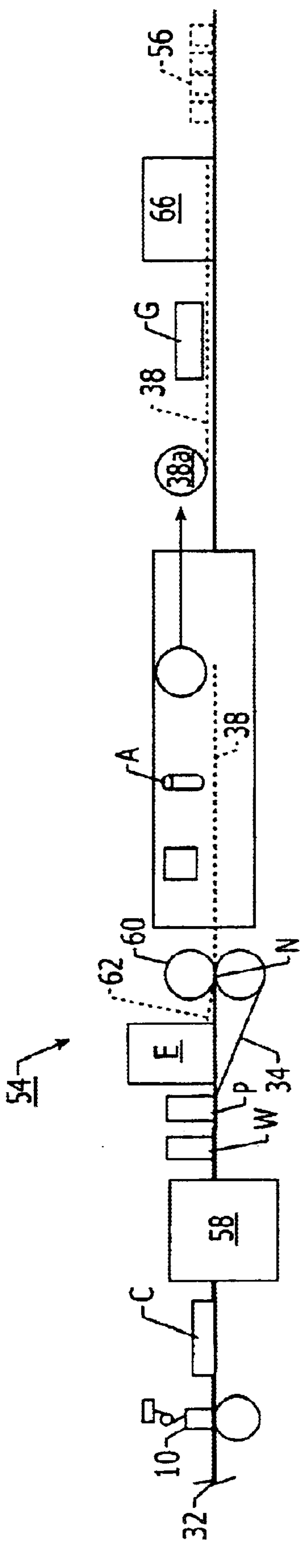
FIG. 8 is a schematic view of a system for performing a method of manufacturing a metallized product in accordance with an aspect of the invention.

FIG. 8 illustrates a system 54 for carrying out a method for forming metallized products 56 in accordance with an aspect of the invention. The first film 32, for example, a plastic web, is shown being stamped by the brass star die 10 in which the inventive star or star pattern 46, 146 as previously described is debossed into the first film 32. The first film 32 may be a polymer, a non-woven polymer, a cellulosic substance, a plastic, a thermoplastic, a rubber or the like. As described previously and by way of example, if plastic is used as the first film 32, the plastic is from between 0.15 inches to about 0.5 inches in thickness.

With more specific reference to FIG. 8, the star die 10 is used to deboss the first film 32 by heating the brass star die 10 to about 130° Fahrenheit. The heated brass die 10 is then pressed into the film 32, which acts as a carrier of the debossed star or star pattern 46, 146. Alternatively, the plastic film 32 may also be heated and stamped with a die 10 that is at ambient temperature or is also heated. Additionally, the star or star pattern 46, 146 can be stepped out in a repeated pattern up to 42 inches.

With further reference to FIG. 8, once the first film 32 has been debossed with the die 10, it is then chemically treated (generally, C) on the embossed side (not shown) and inserted into a metal electroplating bath 58. This bath 58 may be, for instance, a nickel (Ni) bath, which is electrically charged. It should be noted that other processes such as electroless plating processes are suitable to form the metal plate 34 described herein and therefore, the metal bath described above is merely for purposes of providing an enabling disclosure and is not meant as a limitation.

As briefly discussed with respect to FIG. 4 above, the debossed first film 32 is considered the "innie" with the stars depending into the substrate. Utilizing this arrangement, the chemically treated first film 32 and the nickel bath grow the nickel into the debossment or "innie" over a 6 to 12 hour period, for instance, depending on the desired thickness of the nickel plate 34. An embossed surface of the nickel plate 34 is usually 1 mil (0.001 inches) to 3 mils (0.003 inches) thick. Following the desired period, the nickel plate 34 is cleaned and peeled away from the first film 32 (generally, W and P, respectively). The nickel plate 34 or "outie", also described above, is then applied to, for example, a pattern roll 60 for subsequent debossing.

A second film 62 is made, for example, by an extruder E using plastic pellets (not shown). If desired, the second film 62 may be colored or "pigmented" to a desired color during the extrusion step to provide a metallized color aspect to the metallized film 38 as described below. The extruded film 62 is run through a nip N and debossed by the nickel plate 34 disposed on the pattern roll 60. The film 62 then continues into, for instance, a metallizing chamber 64 in which a metal such as aluminum (generally, A) is vacuum deposited on the film 62. As known in the art, a spark from a welding type of apparatus vaporizes aluminum rods or aluminum wire A in the chamber 64 such that the aluminum A migrates to the plastic film 62 and metallizes the film 62.

As introduced, the second film 62 is typically an elastomeric base having a thickness of 2 mils (0.002 inches) to about 4 mils (0.004 inches). However, the second film 62 can also be made of various polymers, such as polyvinyl chloride (PVC), polyesters, or polyolefin, or a cellulosic substance, a plastic, a thermoplastic, a rubber, or like. Likewise, the metal utilized for vacuum deposition is typically aluminum, although tin, zinc, and other metals may also be used.

Also previously described, once the film 62 is metallized to form a metallized film 38, it can be wound and stored or shipped as a metallized plastic film roll 38*a* for future use. Otherwise, the metallized plastic film 38 can be adhesively coated (generally, G) and applied to a cartonboard or other base layer 66 as part of the foregoing process in a conventional manner to produce metallized products such as cartons 56 exhibiting the novel illusion of three-dimensional stars as described herein.

Those of ordinary skill in the art will appreciate that the foregoing descriptions are by way of example only, and are not intended to limit the invention as further described in the appended claims. Thus, it will be apparent to those skilled in the art that various modifications and variations can be made in the present invention without departing from the scope and spirit of the invention. For example, specific shapes, quantities, and arrangements of various elements of the illustrated embodiments may be altered to suit particular applications. Moreover, various embodiments may be interchanged both in whole or in part, and it is intended that the present invention include such modifications and variations as come within the scope of the appended claims and their equivalents.

What is claimed is:

1. A metallized rolled web product comprising:

an elastomeric base defining a plurality of stars debossed therein; and a metal layer bonded to the elastomeric base, the metal layer and the elastomeric base forming a metallic film and cooperable to exhibit the plurality of stars, each of the stars having a plurality of grooves, at least one of the plurality of grooves depending substantially straight from a center of each the stars and the plurality of grooves disposed substantially parallel to each other such that a diffractive light illusion of three dimensions is provided by the metallic film.

2. The metallized rolled web product as in claim 1, wherein the elastomeric base is extruded plastic pellets.

3. The metallized rolled web product as in claim 2, wherein the plastic pellets are colored to provide a color aspect to the metallic film.

4. The metallized rolled web product as in claim 1, wherein the elastomeric base defines a thickness of 2 mils (0.002 inches) to about 4 mils (0.004 inches).

5. The metallized rolled web product as in claim 4, wherein the elastomeric base defines a thickness of 3 mils (0.003 inches).

6. The metallized rolled web product as in claim 1, wherein the metal layer consists of a material selected from the group consisting of aluminum, tin, zinc, and combinations thereof.

7. The metallized rolled web product as in claim 1, wherein the metal layer is vacuum-deposited on the elastomeric base.

8. The metallized rolled web product as in claim 1, further comprising a base layer and an adhesive, the adhesive configured to adhere the metallic film and the base layer together.

9. The metallized rolled web product as in claim 8, wherein the base layer is selected from the group consisting of cartonboard, plastic, polymers, wood, metal, cloth, ceramic and combinations thereof.

10. The metallized rolled web product as in claim 8, wherein the base layer and the metallic film are configured to form a container exhibiting a plurality of stars having an illusion of three-dimensions.

11. The metallized rolled web product as in claim 10, wherein the container is a tissue box configured to dispense a tissue.

12. A metallized rolled web product comprising:

a metallic film having an elastomeric base and a metal layer, the elastomeric base defining a plurality of stars debossed therein, the metal layer bonded to the elastomeric base such that the metallic film exhibits an illusion of the plurality of stars in three-dimensions.

13. The metallized rolled web product as in claim 12, further comprising an adhesive, the adhesive configured to adhere the metal film to a container.

14. The metallized rolled web product as in claim 12, wherein each of the stars has five points, each of the points bifurcated into a first and a second side depending from a center to a tip of each of the stars, a first plurality of grooves disposed on the first side of a first point arranged in a direction different from a second plurality of grooves on the second side of the first point such that an adjacent plurality of grooves on an adjacent side of an adjacent point are aligned in the direction of the first plurality of grooves, the first plurality of grooves and the adjacent plurality of grooves cooperable to direct ambient light rays relative to the viewer.

15. The metallized rolled web product as in claim 14, wherein at least one of the first, second, and adjacent plurality of grooves depends substantially straight from the center.

16. The metallized rolled web product as in claim 14, wherein the first plurality of grooves are substantially parallel to each other, the second plurality of grooves are substantially parallel to each other, and the adjacent plurality of grooves are substantially parallel to each other, the first, second, and adjacent plurality of grooves spaced apart from between 0.5 mils (0.0005 inches) to about 50 mils (0.05 inches).

17. The metallized rolled web product as in claim 14, wherein the first, second, and adjacent plurality of grooves are cut to a depth of from between 0.005 mils (0.000005 inches) to about 0.5 mils (0.0005 inches).

18. The metallized rolled web product as in claim 14, wherein the first, second, and adjacent plurality of grooves are cut at a plurality of different angles, the plurality of angles configured to affect light differently from each other.

* * * * *

UNITED STATES PATENT AND TRADEMARK OFFICE

CERTIFICATE OF CORRECTION

PATENT NO. : 6,800,357 B2
DATED : October 5, 2004
INVENTOR(S) : Gerald J. Keberlein It is certified that error appears in the above-identified patent and that said Letters Patent is hereby corrected as shown below:

Title page,
Item [56], References Cited, U.S. PATENT DOCUMENTS, the following references should be added:

-- 6,346,318 B1 2/2002 Panchyshyn ..............................428/212
6,344,281 B1 2/2002 Smith et al. ...............................428/651
D459,221 S 6/2002 Springer et al. ............................D9/416 --

Signed and Sealed this

Nineteenth Day of July, 2005

JON W. DUDAS
*Director of the United States Patent and Trademark Office*